(12) United States Patent
Rao et al.

(10) Patent No.: US 11,912,296 B2
(45) Date of Patent: *Feb. 27, 2024

(54) ILLEGAL STOPPING ZONE AVOIDANCE SYSTEM

(71) Applicant: Uber Technologies, Inc., San Francisco, CA (US)

(72) Inventors: Shailendra Ramineni Rao, Palo Alto, CA (US); Wesley KaiJie Leung, San Francisco, CA (US); Eleanor Cady Wachsman, San Francisco, CA (US); Jon Ryan Bowen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,767

(22) Filed: Mar. 7, 2022

(65) Prior Publication Data

US 2022/0185310 A1 Jun. 16, 2022

Related U.S. Application Data

(63) Continuation of application No. 16/263,527, filed on Jan. 31, 2019, now Pat. No. 11,299,175.

(51) Int. Cl.
*B60W 50/14* (2020.01)
*B60W 40/09* (2012.01)
*G06V 20/58* (2022.01)

(52) U.S. Cl.
CPC ............ *B60W 50/14* (2013.01); *B60W 40/09* (2013.01); *G06V 20/582* (2022.01);
(Continued)

(58) Field of Classification Search
CPC ..... B60W 2050/146; B60W 2520/105; B60W 2555/60; B60W 2556/50; B60W 40/09;
(Continued)

(56) References Cited

U.S. PATENT DOCUMENTS

2018/0276700 A1* 9/2018 Wang ................ G06Q 30/0217
2018/0328747 A1 11/2018 Farmer et al.
(Continued)

OTHER PUBLICATIONS

"U.S. Appl. No. 16/263,527, Final Office Action dated Aug. 18, 2021", 30 pgs.
"U.S. Appl. No. 16/263,527, Final Office Action dated Nov. 18, 2020", 29 pgs.
"U.S. Appl. No. 16/263,527, Non Final Office Action dated Apr. 27, 2020", 14 pgs.
(Continued)

*Primary Examiner* — Quan Zhen Wang
*Assistant Examiner* — Rajsheed O Black-Childress
(74) *Attorney, Agent, or Firm* — SCHWEGMAN LUNDBERG & WOESSNER, P.A.

(57) ABSTRACT

Systems and methods for avoiding illegal stopping zones are provided. In example embodiments, a networked system identifies a destination of a driver providing a transportation service to a user. The networked system monitors a user device of the driver, and infers, based on the monitoring, that the driver is planning to stop in an illegal stopping zone located a predetermined distance to the destination. The inference is based on device data such as accelerometer data or location data that is triangulated with known or derived illegal stopping zones. In response, the networked system causes presentation of a notification on a user interface of the device of the driver. The notification provides an indication of the illegal stopping zone. In some embodiments, the notification also provides an alternative stopping location determined by the networked system.

17 Claims, 8 Drawing Sheets

(52) U.S. Cl.
CPC ..... *G06V 20/586* (2022.01); *B60W 2050/146* (2013.01); *B60W 2555/60* (2020.02)

(58) Field of Classification Search
CPC .............. B60W 50/0097; B60W 50/14; B60K 2370/56; B60K 2370/566; B60K 35/00; G06Q 10/083; G06Q 2240/00; G06Q 50/30; G01C 21/3438; G06V 20/582; G06V 20/586; G08G 1/207
See application file for complete search history.

(56) References Cited

U.S. PATENT DOCUMENTS

| | | |
|---|---|---|
| 2018/0357900 A1 | 12/2018 | Wang |
| 2019/0017839 A1* | 1/2019 | Eyler ..................... G01C 21/32 |
| 2020/0247430 A1 | 8/2020 | Rao et al. |

OTHER PUBLICATIONS

"U.S. Appl. No. 16/263,527, Non Final Office Action dated Apr. 29, 2021", 28 pgs.

"U.S. Appl. No. 16/263,527, Notice of Allowance dated Dec. 10, 2021", 8 pgs.

"U.S. Appl. No. 16/263,527, Response filed Mar. 18, 2021 to Final Office Action dated Nov. 18, 2020", 12 pgs.

"U.S. Appl. No. 16/263,527, Response filed Jul. 27, 2020 to Non Final Office Action dated Apr. 27, 2020", 13 pgs.

"U.S. Appl. No. 16/263,527, Response filed Jul. 29, 2021 to Non Final Office Action dated Apr. 29, 2021", 11 pgs.

"U.S. Appl. No. 16/263,527, Response filed Nov. 15, 2021 to Final Office Action dated Aug. 18, 2021", 12 pgs.

U.S. Appl. No. 16/263,527, filed Jan. 31, 2019, Illegal Stopping Zone Avoidance System.

\* cited by examiner

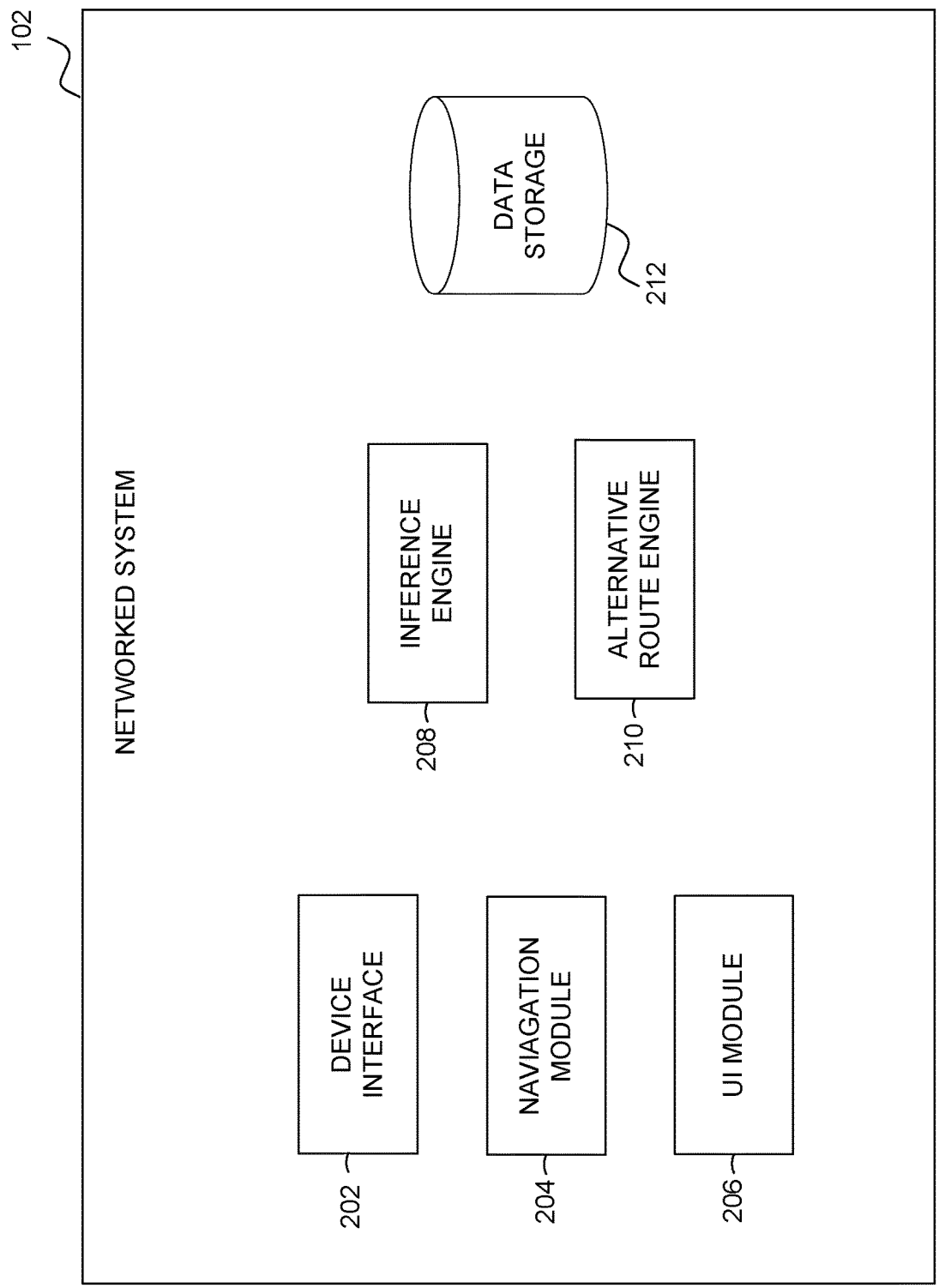

ILLEGAL STOPPING ZONE AVOIDANCE SYSTEM

CLAIM FOR PRIORITY

This application is a continuation of U.S. application Ser. No. 16/263,527, filed Jan. 31, 2019, which is hereby incorporated by reference in its entirety.

TECHNICAL FIELD

The subject matter disclosed herein generally relates to special-purpose machines configured for providing networked guidance to avoid an illegal stopping zone, and to the technologies by which such special-purpose machines become improved compared to other machines that provide navigation guidance. Specifically, the present disclosure addresses systems and methods that detects and provides guidance to avoid vehicle stoppage in an illegal stopping zone.

BACKGROUND

Conventionally, navigation systems provide a navigable route from a starting point to an end point. However, these conventional navigation systems do not indicate where illegal stopping zones are located. In particular, these conventional navigation systems do not detect that the starting point or the end point are located within an illegal stopping zone such as a bus stop, bike lanes, or other types of red zones. As a result, when a vehicle stops in one of these illegal stopping zones, the vehicle may be ticketed.

BRIEF DESCRIPTION OF THE DRAWINGS

Some embodiments are illustrated by way of example and not limitation in the figures of the accompanying drawings.

FIG. 2 is a block diagram illustrating components of a networked system for providing an illegal stopping zone avoidance system, according to some example embodiments.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for avoiding illegal stopping zones. Specifically, example embodiments provide guidance (e.g., notifications, alternative legal stopping locations) for avoiding illegal stopping zones. In example embodiments, a networked system identifies a destination of a driver providing a transportation service to a user. The networked system monitors a user device of the driver and infers that the driver is planning to stop in an illegal stopping zone located a predetermined distance to the destination indicated by the user, whereby the destination comprises a pick-up location or drop off location. The inference is based on device data such as accelerometer data or location data from a device of the driver that is triangulated with known or derived data indicating illegal stopping zones. In response to the inference, the networked system causes presentation of a notification on a user interface of the device of the driver. In some embodiments, the notification provides an indication of the illegal stopping zone. In further embodiments, the notification visually distinguishes the illegal stopping zone from legal stopping areas or locations and may also provide an alternative stopping location determined by the networked system.

Thus, example methods (e.g., algorithms) and example systems (e.g., special-purpose machines) are configured to improve a navigation process by providing an illegal stopping zone avoidance system. Therefore, one or more of the methodologies described herein facilitate solving the technical problem of providing navigation guidance that assists in avoiding illegal stopping zones within a networked environment (e.g., ride sharing service, food or item delivery service).

Figure 1:
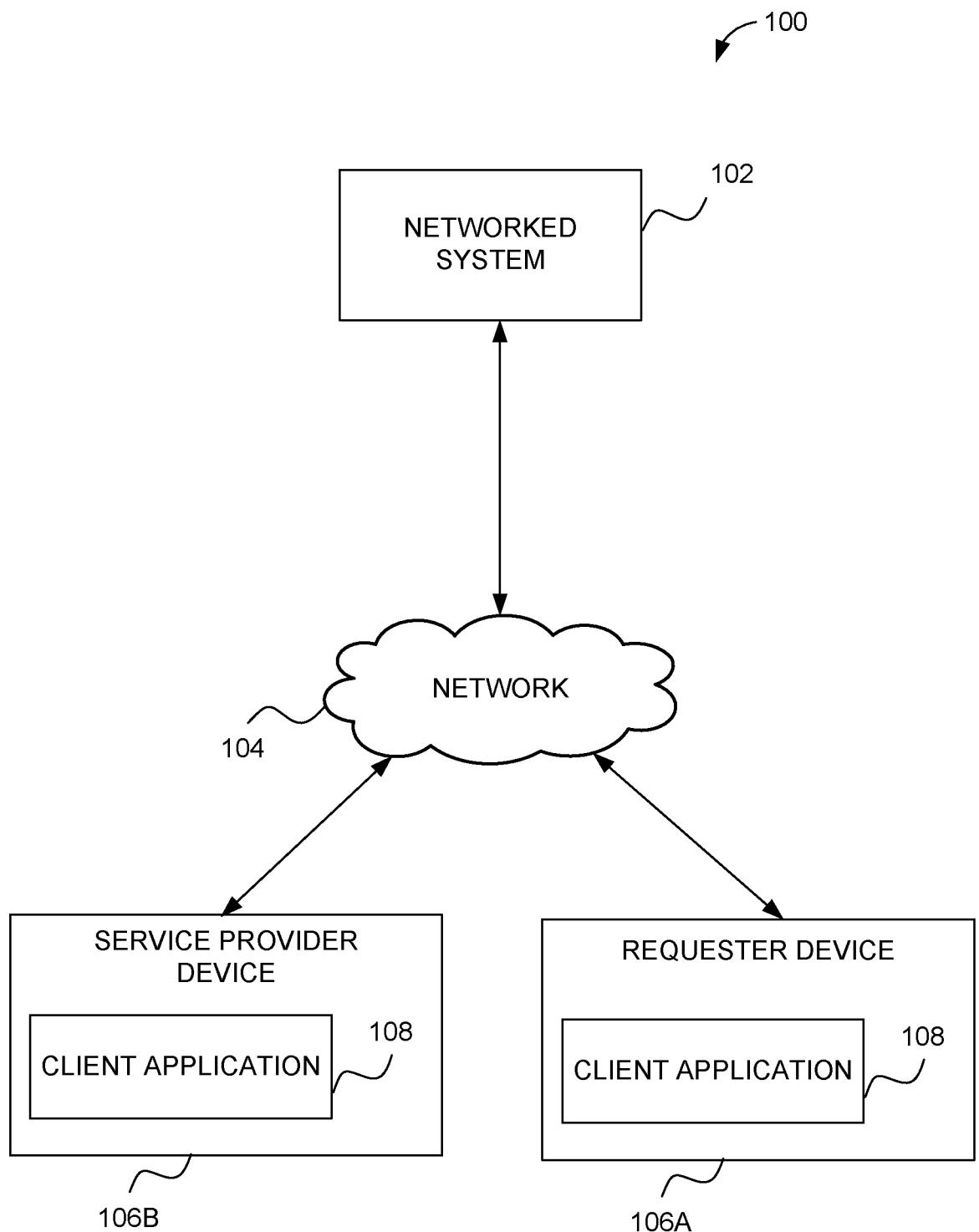
FIG. 1 is a diagram illustrating a network environment suitable for providing an illegal stopping zone avoidance system, according to some example embodiments.

FIG. 1 is a diagram illustrating a network environment 100 suitable for providing an illegal stopping zone avoidance system, according to example embodiments. The network environment 100 includes a networked system 102 communicatively coupled via a network 104 to a requester device 106a and a service provider device 106b (collectively referred to as "user devices 106"). In example embodiments, the networked system 102 comprises components that obtain, store, and analyze data received from the user devices 106 and other sources in order to machine-learn legal and illegal stopping locations, infer or detect that a driver is going to potentially stop in an illegal stopping zone, and dynamically reroute the driver to a legal stopping zone or location. The components of the networked system 102 are described in more detail in connection with FIG. 2 to FIG. 4 and may be implemented in a computer system, as described below with respect to FIG. 8.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the networked system 102 through a client application 108 stored thereon. The client application 108 of the user devices 106 allow for exchange of information with the networked system 102 via user interfaces as well as in the background. For example, the client application 108 running on the user devices 106 may determine location information of the user devices 106 (e.g., current location in latitude and longitude), and the location information is provided to the networked system 102, via the network 104, for storage and analysis. In particular, the location information is used by the networked system 102 to monitor a navigable route between a pick-up location to a drop off location.

In example embodiments, a first user (e.g., a rider) operates the requester device 106a that executes the client application 108 to communicate with the networked system 102 to make a request for transport or delivery service (referred to collectively as a "trip"). In some embodiments, the client application 108 determines or allows the user to specify a pick-up location (e.g., of the user or an item to be delivered) and to specify a drop-off location for the trip. The client application 108 also presents information, from the networked system 102 via user interfaces, to the user of the requester device 106a. For instance, the user interface can display a notification that an illegal stopping zone is in proximity of the pick-up location or drop off location or the user interface can display an alternative stopping location. Further still, the notification can visually distinguish the illegal stopping zone from legal stopping locations (e.g., show illegal stopping zone with a red line).

A second user (e.g., a driver) operates the service provider device 106b to execute the client application 108 that communicates with the networked system 102 to exchange information associated with providing transportation or delivery service (e.g., to the user of the requester device 106a). The client application 108 presents information via user interfaces to the user of the service provider device 106b, such as invitations to provide transportation or delivery service, navigation instructions, pickup and drop-off locations of people or items, and notifications of illegal stopping zones. The client application 108 also provides data to the networked system 102 such as a current location (e.g., coordinates such as latitude and longitude) of the service provider device 106b and accelerometer data (e.g., speed at which a vehicle of the second user is traveling).

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the user device 106 may be embodied within the networked system 102. While only a single networked system 102 is shown, alternative embodiments may contemplate having more than one networked system 102 to perform server operations discussed herein for the networked system 102.

FIG. 2 is a block diagram illustrating components of the networked system 102, according to some example embodiments. In various embodiments, the networked system 102 obtains and stores trip information (e.g., pick-up and drop-off locations, routes, selection of routes) received from the user devices 106, monitors current trips, detects that a user is potentially going to stop in an illegal stopping zone, analyzes stored trip information to identify an alternative stopping location, and notifies the user about the illegal stopping zone and the alternative stopping location. To enable these operations, the networked system 102 comprises a device interface 202, a navigation module 204, a user interface (UI) module 206, an inference engine 208, an alternative route engine 210, and a data storage 212 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices 106 and cause presentation of one or more user interfaces generated by the UI module 206 on the user devices 106 including user interfaces having notifications of an upcoming illegal stopping zone and an alternative, legal stopping zone. In some embodiments, the device interface 200 generates and transmits instructions (or the user interfaces themselves) to the user devices 106 to cause the user interfaces to be displayed on the user devices 106. The user interfaces can be used to request transportation or delivery service from the requester device 106a, display invitations to provide the service on the service provider device 106b, present navigation instructions including maps, and provide notifications. At least some of the information received from the user devices 106 are stored to the data storage 212.

The navigation module 204 manages generation and monitoring of routes between a pick-up location and a drop off location. In example embodiments, the navigation module 204 receives, via the network 104 and device interface 202, a request for transportation service (of a person or item) from a pick-up location to a drop off location. Using the pick-up location and drop off location, the navigation module 204 calculates a route between the two locations. In some embodiments, the pick-up location and/or the drop off location indicates an address. In other embodiments, the pick-up location and/or the drop off location are names of a location and the navigation module 204 determines an address or coordinates for these locations in order to generate the route.

The navigation module 204 also receives device data including location information (e.g., coordinates) of the user devices 106. The location information may be obtained by a global positioning system component associated with the user device 106. The navigation module 204 analyzes (e.g., extracts, parses) the location information to identify, for example, a current location of the user device 106 and the user. As such, the navigation module 204 monitors a vehicle of a user (e.g., driver) as the vehicle traverses the navigation route.

Further still, the navigation module 204, in some embodiments, reroutes the user to the alternative stopping location (determined by the alternative route engine 210. The rerouting comprises calculating a route to the alternative stopping location whereby the route to the alternative stopping location is different from an original route calculated to the destination by the navigation module 204.

The user interface (UI) module 206 manages generation of user interfaces that are presented, via the client application 108, at the user device 106. The user interfaces can be used to request transport or delivery service from the requester device 106a, display invitations to provide the service on the service provider device 106b, present navigation instructions and maps, and provide notifications such as notifications of illegal stopping zones and alternative stopping locations.

The inference engine 208 is configured to infer that a driver is planning to stop in an illegal stopping zone located approximately at, or in proximity to, a destination indicated by the user. The destination may comprise a pick-up location or a drop off location of a rider or an item to be delivered. The inference can be based on one or more of speed of the vehicle, destination address, and/or location information. The inference engine will be discussed in more detail in connection with FIG. 3 below.

The alternative route engine 210 is configured to determine an alternative route that allows for legal stopping of the vehicle. In example embodiments, a determination that the driver is planning to stop in the illegal stopping zone by the inference engine 208 triggers the alternative route engine 210 to determine the alternative route (e.g. via a signal generated and sent by the inference engine 208. The alternative route engine 210 will be discussed in more detail in connection with FIG. 4 below.

The data storage 212 is configured to store information associated with each user of the networked system 102. The information includes various trip data used by the networked system 102 to machine-learn location information including likely illegal stopping zones and legal stopping locations. In some embodiments, the data is stored in or associated with a user profile corresponding to each user and includes a history of interactions using the networked system 102. The data storage 212 also stores the machine-learned locations. While the data storage 212 is shown to be embodied within the networked system, alternative embodiments can locate the data storage elsewhere and have the networked system 102 communicatively coupled to the networked system 102.

Figure 3:
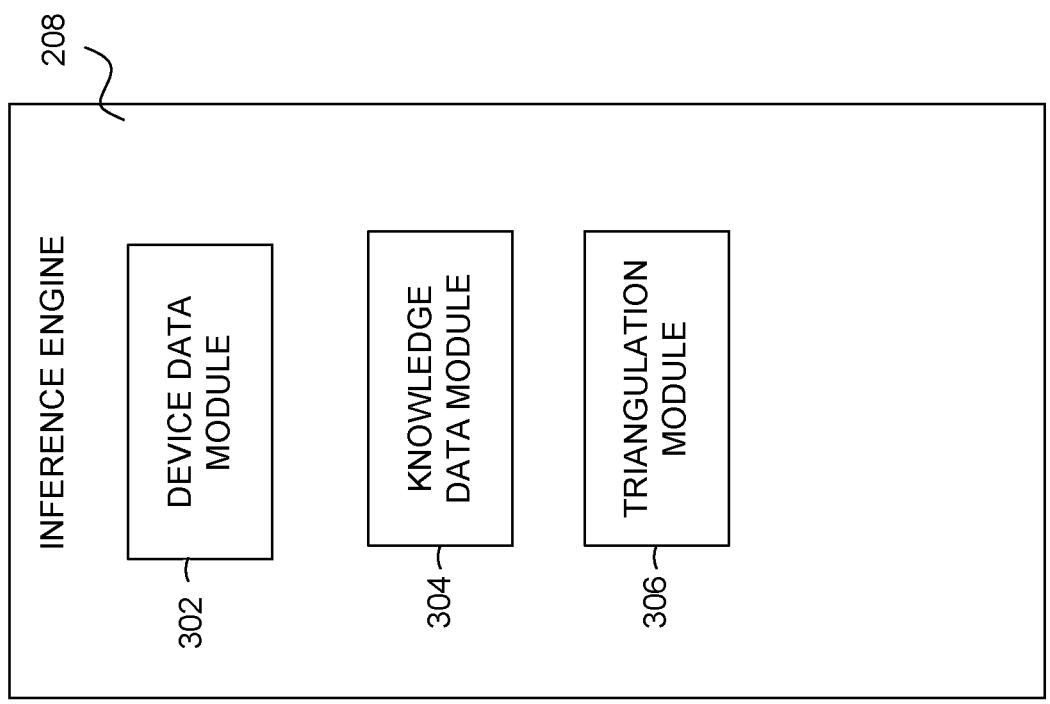
FIG. 3 is a block diagram illustrating components of an inference engine, according to some example embodiments.

FIG. 3 is a block diagram illustrating components of the inference engine 208, according to some example embodiments. In example embodiments, the inference engine 208 is configured to infer (e.g., determine, detect, predict) that a driver will likely be stopping in an illegal stopping zone located approximately at, or in proximity, to a destination (e.g., pick-up location or drop off location) indicated by the user. To enable these operations, the inference engine 208 comprises a device data module 302, a knowledge data module 304, and a triangulation module 306 all configured to communicate with each other (e.g., via a bus, shared memory, or a switch). The inference engine 208 may also comprise other components (not shown) that are not pertinent to example embodiments.

The device data module 302 accesses (e.g., obtains, receives, retrieves) device data originating from the user device 106 (e.g., of the driver). In some embodiments, the device data comprises accelerometer data for a vehicle of the driver. The accelerometer data indicates a speed of the vehicle and may also indicate whether the vehicle is slowing down (e.g., in anticipation of stopping). In some embodiments, the device data comprises current location information such as GPS coordinates of where the vehicle is located.

The knowledge data module 304 accesses (e.g., obtains, receives, retrieves) and curates knowledge data from a knowledge database (e.g., within the data storage 212). The knowledge data comprises curated localized data for an area including illegal stopping zones (e.g., red zones, no parking zone, bus stops, bike lanes) or legal stopping zones (e.g., passenger zones, parking lot). The knowledge data may be curated from a plurality of sources including, for example, government databases, user (e.g., driver or rider) generated content indicating the knowledge data, operator/agent curated data, and networked system 102 derived data. In some embodiments the networked system 102 derived data is obtained from analysis of stored trip data. For instance, if a threshold number or percentage of vehicles stop in a first location but avoid a second location associated with a destination, the networked system 102 infers that the first location is likely a passenger zone or a legal stopping zone and that the second location is likely an illegal stopping zone. The operator/agent curated data comprises data manually verified and entered by operators or agents of the networked system 102. The knowledge data can be stored to the data storage 212 for use by other components of the networked system 102. Whether the data is automatically curated (e.g., from government or public databases), manually curated by networked system operators or agents, collected from customer feedback, or derived from trip data, the networked system 102 is able to combine it all together to provide the most comprehensive view of the ground truth curb data.

The triangulation module 306 triangulates the device date with the knowledge data to infer whether the driver is/will likely stop their vehicle in an illegal stopping zone that is within a predetermined distance to the destination. In one embodiment, the triangulation module 306 detects based on the accelerometer data that the vehicle is slowing down and further determines, based on the knowledge data, that the vehicle is within a threshold distance of the illegal stopping zone. In another embodiment, the triangulation module 306 detects, from the device data, a location of the vehicle of the driver and determines that the location is within the threshold distance the destination. The triangulation module 306 further detects that the destination (e.g., based on an address) is located within a predetermined distance to an illegal stopping zone (e.g., address is a building that has a bus stop in front of it) based on the knowledge data. Because the driver is approaching the illegal stopping zone (e.g., within the threshold distance to the illegal stopping zone), the triangulation module 306 infers that the driver plans to stop in the illegal stopping zone. In all of the above embodiments, the triangulation module 306 triggers the alternative route engine 210 to determine an alternative stopping location and the UI module 206 to provide a notification regarding the illegal stopping zone and the alternative stopping location. In some embodiments, the UI module 206 limits the presentation of the notification to within a predetermined distance of the illegal stopping zone, while in other embodiments, the UI module 206 presents the notification at the start of a trip or during the trip.

Figure 4:
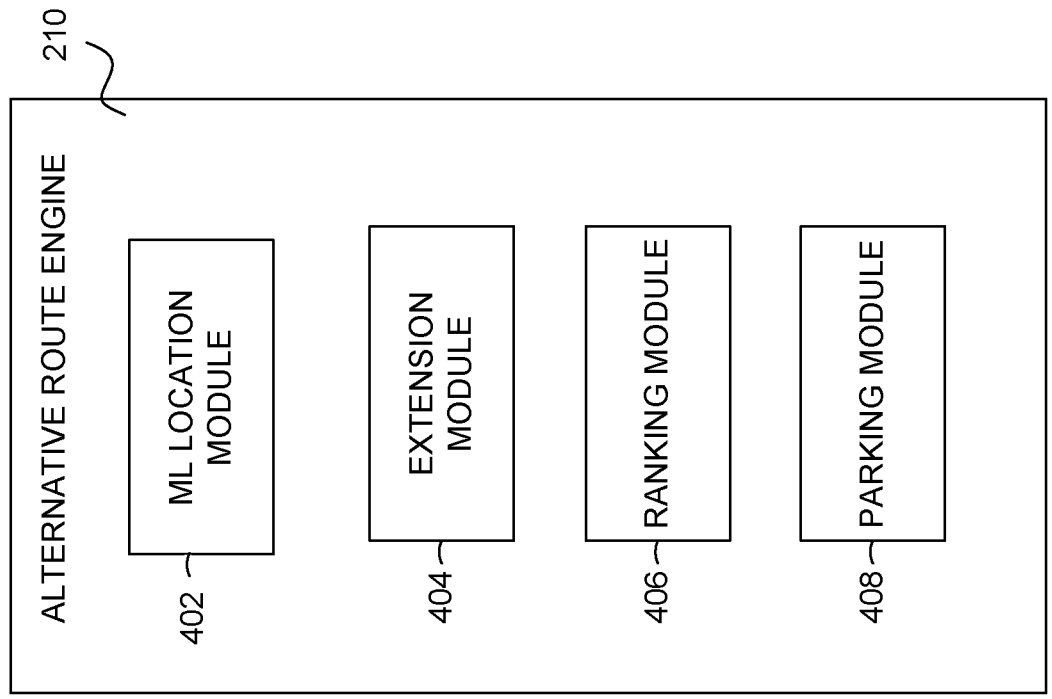
FIG. 4 is a block diagram illustrating components of an alternative route engine, according to some example embodiments.

FIG. 4 is a block diagram illustrating components of the alternative route engine 210, according to some example embodiments. The alternative route engine 210 is configured to determine an alternative location that allows for legal stopping of the vehicle. To enable these operations, the alternative route engine 210 comprises a machine learning (ML) location module 402, an extension module 404, a ranking module 406, and a parking module 408. In example embodiments, one or more of the components of the alternative route engine 210 identifies the alternative stopping location. Not all components may be used in different embodiments. For example, one embodiment, may use an alternative stopping location determined by the ML location module 402, while a different embodiment uses an alternative stopping location identified by the extension module 404. In yet a further embodiment, more than one alternative locations are identified (e.g., by the ML location module 402, extension module 404, parking module 408) and ranked to identified a best alternative location.

In example embodiments, the ML location module 402 identifies a machine-learned alternative stopping location. The ML location module 402 learns (e.g., machine learns) locations that are likely legal stopping locations (and in some cases, also learns illegal stopping zones/locations). In example embodiments, the ML location module 402 analyzes stored (historical) trip data from a plurality of users to identify hotspots that are frequent pick-up and drop off locations. Frequency can be based on a threshold number or percentage of stops at the location over a particular period of time. The ML location module 402 infers that, based on fact that these are frequent pick-up and drop off locations, the hotspots are legal stopping locations. When the alternative route engine 210 is triggered to identify an alternative stopping location, the ML location module 402, in example embodiments, analyzes machine-learned legal stopping locations (e.g., stored in the data storage 212) near the destination to identify one or more alternative locations for stopping the vehicle.

The extension module 404 identifies an alternative stopping location based on extending a route. In example embodiments, the extension module 404 analyzes the navigation route generated by the navigation module 204 including a direction that the vehicle is traveling. The extension module 404 then identifies a location that extends the navigation route in the direction that the vehicle is traveling to a legal stopping location in the same direction. In some embodiments, the extension is limited to a threshold distance (e.g., not more than a block away from the destination, not more than 500 feet from the destination). In some cases (e.g., if there is no legal stopping location within the threshold distance), the extension module 404 can determine that a location just short of the destination is a legal stopping zone.

The ranking module 406 ranks alternative stopping location if more than one is identified. In various embodiments, the alternative stopping locations can be ranked based on one or more of distance from destination, traffic in the area of the destination, ease for rider to walk to the destination (e.g., not through a construction zone or up a hill), and so forth.

The parking module 408 identifies parking locations (e.g., parking lot, delivery zones; passenger zones) that can serve as a legal stopping location where the driver can park their vehicle. In some cases, the driver needs to park their vehicle in order to retrieve an item to be delivered or to deliver the item to a recipient. In some embodiments, the parking module 408 accesses the knowledge data (e.g., via the knowledge data module 304 or from the data storage 212), which comprises curated localized data for an area including legal stopping zones (e.g., passenger zones, parking lot). Using the knowledge data, the parking module 408 identifies a location where the driver can park their vehicle for a short period of time.

Figure 5:
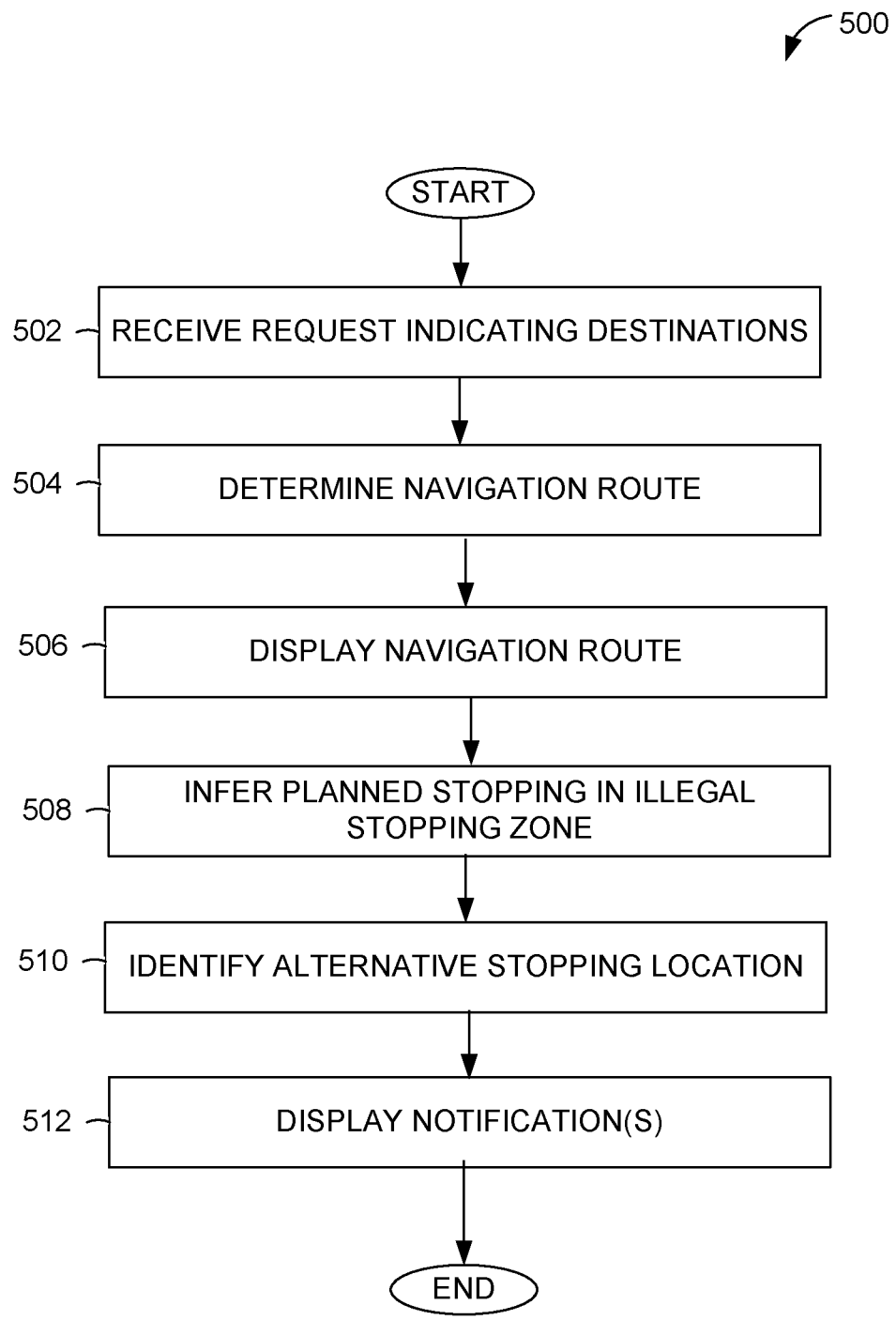
FIG. 5 is a flowchart illustrating operations of a method for providing guidance to avoid stopping in an illegal stopping zone, according to some example embodiments.

FIG. 5 is a flowchart illustrating operations of a method 500 for providing networked guidance to avoid stopping in an illegal stopping zone, according to some example embodiments. Operations in the method 500 may be performed by the networked system 102, using components described above with respect to FIG. 2. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, the device interface 202 receives, via the client application 108, a request indicating a destination. The request is for transportation service between two locations. As such, the destination comprises one or more of a pick-up location for a person or item and/or a drop off location/delivery address. The destination(s) are then provided to the navigation module 204.

In operation 504, the navigation module 204 determines a navigation route. Using the pick-up location and drop off location, the navigation module 204 calculates a navigation route between the two locations. In some embodiments, the pick-up location and/or the drop off location indicates an address. In other embodiments, the pick-up location and/or the drop off location are names of a location and the navigation module 204 determines an address or coordinates for these locations in order to generate the navigation route. Further still, the navigation module 204 determines a navigation route to a pick-up location (for an item or person) from a current position of the driver and his vehicle.

In operation 506, the navigation route is caused to be displayed (via the client application 108) on the user device 106. In example embodiments, the UI module 206 generates a user interface (or instructions to generate the user interface at the user device 106) that displays the navigation route. The device interface 202 then transmits the user interface or the instructions to the user device 106 for display. In some cases, the navigation route is from a current location of the driver to a pick-up location. In other cases, the navigation route is from a pick-up location to a drop off location.

In operation 508, the inference engine 208 infers that the driver is planning to stop in an illegal stopping zone. Operation 508 will be discussed in more detail in connection with FIG. 6 below.

In operation 510, the alternative route engine 210 identifies an alternative stopping location for the destination. In some embodiments, the alternative route engine 210 identifies (e.g., using the ML location module 402) a machine-learned alternative stopping location that have been machine learned from stored historical trip data from a plurality of users to identify hotspots that are frequent pick-up and drop off locations near (e.g., approximate to, in proximity to) the destination. The ML location module 402 infers that these are frequent pick-up and drop off locations are legal stopping locations. In other embodiments, the alternative route engine 210 (e.g., the extension module 404) identifies an alternative stopping location based on extending the navigation route when possible (e.g., within a threshold distance of the destination). In cases where there are no legal stopping location within the threshold distance, the extension module 404 can identify a legal stopping location just short of the destination (e.g., within a threshold distance of the destination).

Further still, the parking module 408 of the alternative route engine 210 can identify a parking location (e.g., parking lot, delivery zones; passenger zones) that can serve as a legal stopping location for a short period of time. In some embodiments, the parking module 408 accesses the knowledge data (e.g., via the knowledge data module 304 or from the data storage 212), whereby the knowledge data comprises curated localized data for an area including legal stopping zones (e.g., passenger zones, parking lot). Using the knowledge data, the parking module 408 identifies a location where the driver can park their vehicle for a short period of time.

In some embodiments, the ranking module 406 of the alternative route engine 210 ranks alternative stopping location if more than one is identified. In various embodiments, the alternative stopping locations can be ranked based on one or more of distance from destination, traffic in the area of the destination, ease for rider to walk to the destination (e.g., not through a construction zone or up a hill), or other parameter. In one embodiment, each parameter comprises a weight that is applied to determine a highest ranking alternative stopping location.

In operation 512, the networked system 102 causes display of a notification on one or more user devices 106. In example embodiments, the UI module 206 generates the notification, updates the user interface, and provides (via the device interface 202) the user interface to the user device 106 for display.

In some embodiments, different notifications are provided to the requester device 106a and the service provider device 106b by the networked system 102. For example, the requester device 106a may be warned that the driver cannot stop at the destination but will stop in an alternative stopping location. In some cases, the user of the requester device 106a may be told to walk to the alternative stopping location (if the destination in the illegal stopping zone is a pick-up location) and is provided with navigation directions, if necessary, to the alternative stopping location. In contrast, the driver (e.g., user of the service provider device 106b) receives a notification that the rider has been told about the alternative stopping location.

In various embodiments, operation 510 is optional. In these embodiments, the networked system 102 infers (e.g., determines) that the driver is or will be stopping in an illegal stopping zone. Based on that inference, the networked system 102 provides a notification that the destination is an illegal stopping location in operation 512. The driver can then look for a legal stopping location (e.g., an area that is not a red zone; a parking meter; a parking lot; a passenger zone). Similarly, the rider can be provided a notification that indicates that the destination is an illegal stopping location and that the driver will look for an alternative legal stopping location.

Figure 6:
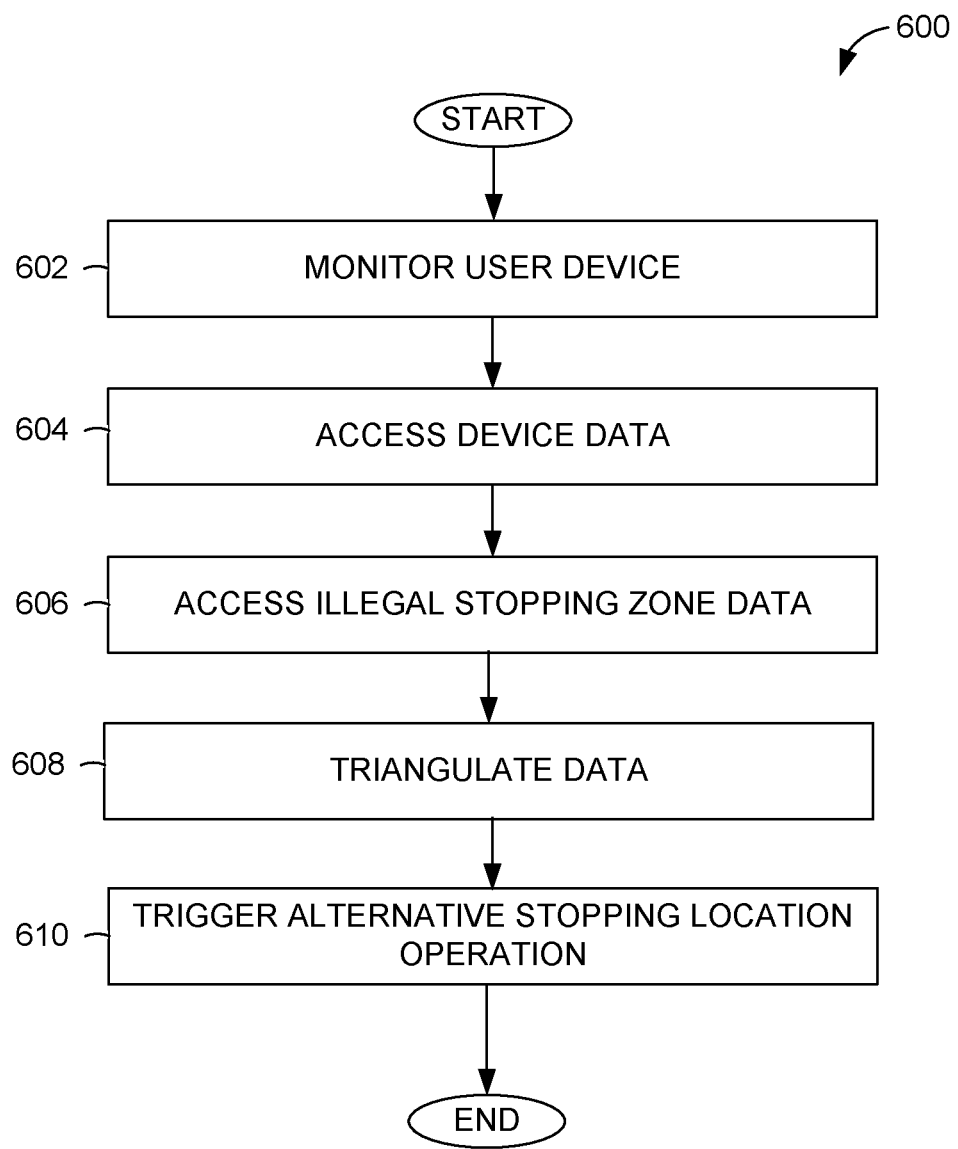
FIG. 6 is a flowchart illustrating operations of a method for inferring potential stoppage in an illegal stopping zone, according to some example embodiments.

FIG. 6 is a flowchart illustrating operations of a method 600 (operation 508) for inferring potential stoppage in an illegal stopping zone, according to some example embodiments. Operations in the method 600 may be performed by the networked system 102, using components described above with respect to FIG. 2 and FIG. 3. Accordingly, the method 600 is described by way of example with reference to the networked system 102 and the inference engine 208. However, it shall be appreciated that at least some of the operations of the method 600 may be deployed on various other hardware configurations or be performed by similar components residing elsewhere in the network environment 100. Therefore, the method 600 is not intended to be limited to the networked system 102.

In operation 602, the navigation module 204 monitors the user device(s) 106. In example embodiments, the navigation module 204 receives device information including location information (e.g., coordinates) from the user devices 106 (e.g. via the device interface 202). The navigation module 204 analyzes (e.g., extracts, parses) the location information to identify a current location of the user device 106. As a result, the navigation module 204 monitors the user device(s) 106 and the vehicle of the driver as the vehicle traverses the navigation route to the destination (e.g., pick-up location or drop off location).

In operation 604, device data module 302 accesses device data of the user device (e.g., the service provider device 106b). In some embodiments, the device data comprises accelerometer data for a vehicle of the driver. The accelerometer data indicates a speed of the vehicle and may also indicate whether the vehicle is slowing down (e.g., in anticipation of stopping) or has stopped. Alternatively, the device data comprises current location information such as GPS coordinates of where the vehicle is located. In this alternative embodiment, operation 604 is not needed. Instead, the monitoring in operation 602 detects the location of the user device and vehicle.

In operation 606, the knowledge data module 304 accesses knowledge data (e.g., from the data storage 212)

comprising curated localized data for an area including illegal stopping zones (e.g., red zones, no parking zone, bus stops, bike lanes). The knowledge data may be curated from a plurality of sources or derived from analysis of stored trip data.

In operation 608, the triangulation module 306 triangulates the device date with the knowledge data to infer whether the driver is/will likely stop their vehicle in an illegal stopping zone within a predetermined distance to the destination, whereby the predetermined distance can be zero or a distance measured, for example, in feet. In one embodiment, the triangulation module 306 detects (e.g., from the device data) that the vehicle is slowing down (or has stopped) and further determines, from the knowledge data, that the vehicle is within a threshold distance of an illegal stopping zone that is within the predetermined distance to the destination.

In another embodiment, the triangulation module 306 detects, from the device data, a location of the vehicle of the driver and determines that the location is within a threshold distance of the destination. The triangulation module 306 further detects that the destination (e.g., based on an address) is located within a predetermined distance to an illegal stopping zone (e.g., address is a building that has a bus stop in front of it) based on the knowledge data. In one embodiment, the predetermined distance is zero (e.g., the illegal stopping zone is the destination). In other embodiments, the predetermined distance is a few feet (e.g., where the illegal stopping location is curbside and the destination is a building next to the curb). Because the driver is approaching the illegal stopping zone (e.g., within the threshold distance of the illegal stopping zone), the triangulation module 306 infers that the driver plans to stop in the illegal stopping zone.

Based on the inference in operation 608, the triangulation module 306 triggers the alternative route engine 210 to determine an alternative stopping location as discussed above.

Figure 7C:
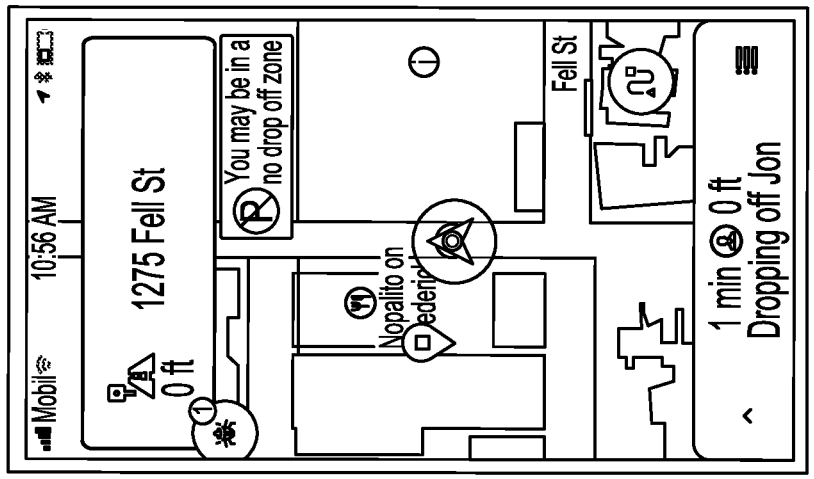
FIG. 7A-7E illustrate example screenshots displaying notification of the illegal stopping zone.
Figure 7B:
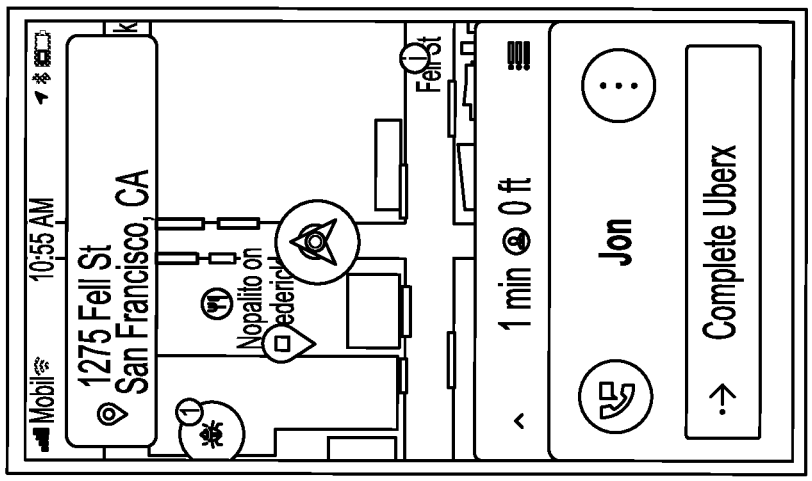
Figure 7A:
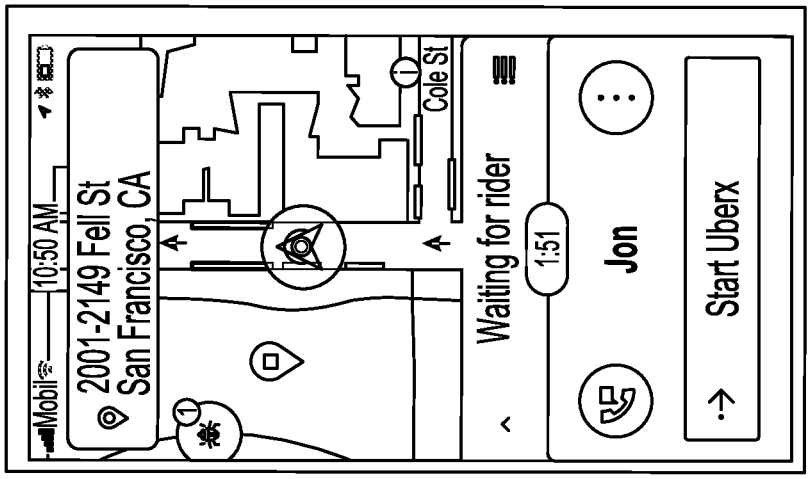

FIG. 7A-7E illustrate example screenshots displaying notification of the illegal stopping zone. FIG. 7A is a screen shot of a user interface showing a notification provided on the service provider device 106b when the driver is picking up a person or item. The notification includes indications of illegal stopping zones that are visually distinguished from legal stopping locations/zones. For example, the illegal stopping zone can be shown as red lines (or red zones) on a map.

Similarly, FIG. 7B is a screen shot of the user interface showing a notification provided on the service provider device 106b when the driver is dropping off the person or item. Here, the notification includes indications of illegal stopping zones that are visually distinguished (e.g., by a red line) from legal stopping locations/zones. It is noted that other mechanisms for visually distinguishing the illegal stopping zone can be used.

FIG. 7C illustrates a screen shot of the user interface providing alternative notification on the service provider device 106b when the driver is dropping off the person or item. In the embodiment of FIG. 7C, the driver is approaching the drop off location. As the driver approaches, the user interface displays the notification that indicates that driver may be in a no stopping (or dropping off) zone. A similar notification can also be used when the driver approaches a pick-up location.

Figure 7D:
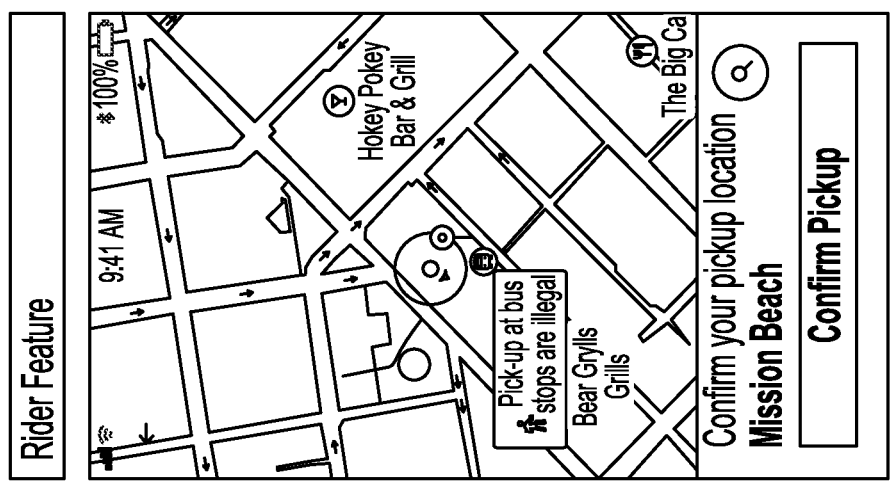

FIG. 7D illustrates a screen shot of a user interface that is displayed on a requester device 106a. In this example, the user (e.g., rider) is notified that their indicated pick-up location is an illegal stopping location (e.g., a bus stop). The user interface shows a bus stop icon as well as the pick-up location (e.g., a pin). In one embodiment, the bus stop can be shown enlarged to indicate a size of the illegal stopping zone (e.g., encompassing the pick-up location). In a further embodiment, the user interface illustrates an alternative pick-up location to which the rider should walk.

Figure 7E:
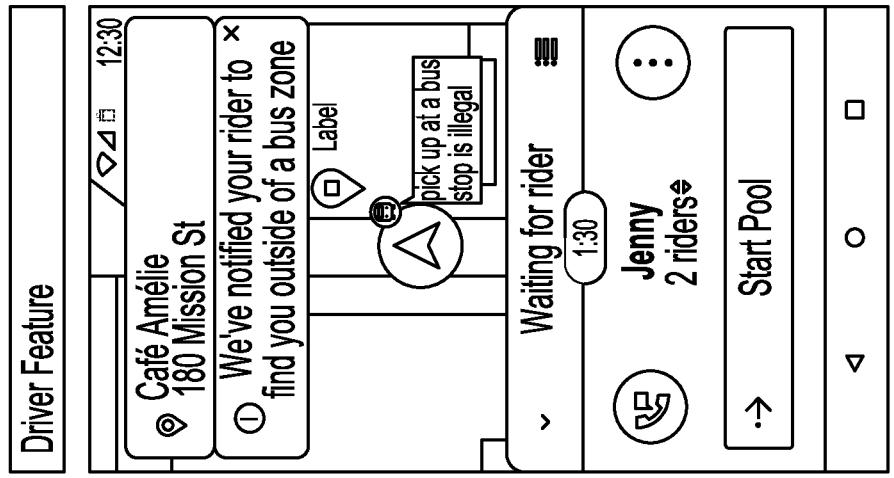

FIG. 7E illustrates a comparable screen shot of a user interface that is displayed to the driver that is picking up the rider of FIG. 7D. The user interface provides a notification that the rider has been notified to travel outside of the illegal stopping zone and indicate the alternative stopping location.

Figure 8:
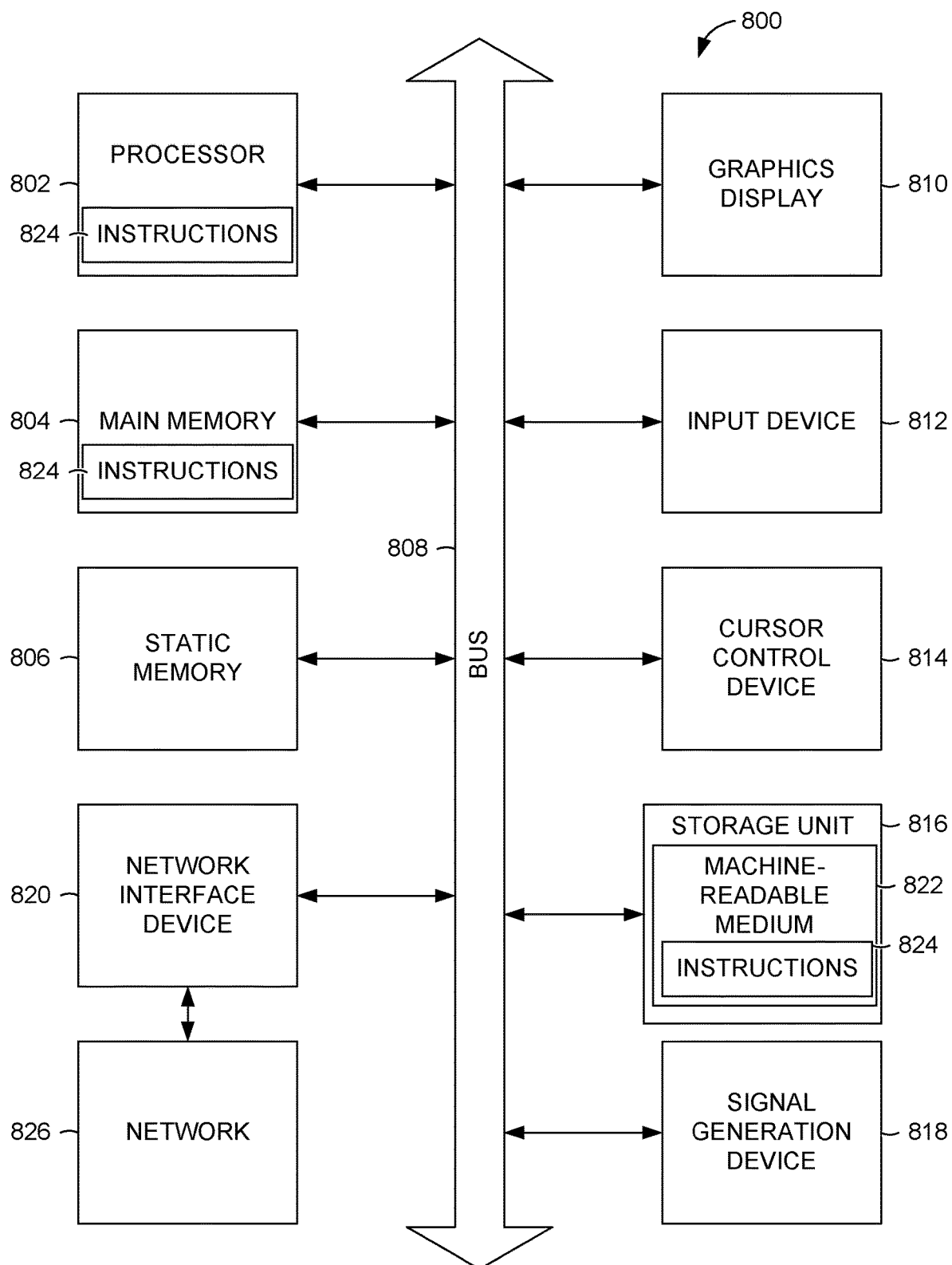
FIG. 8 is a block diagram illustrating components of a machine, according to some example embodiments, able to read instructions from a machine-readable medium and perform any one or more of the methodologies discussed herein.

FIG. 8 illustrates components of a machine 800, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIGS. 5 and 6. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-readable medium 822 (e.g., a tangible machine-readable storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-readable media (e.g., tangible and non-transitory machine-readable media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing navigation guidance to avoid illegal stopping zones. The method comprises identifying, by a networked system, a destination of a driver providing a transportation service to a user; monitoring, by the networked system, a user device of the driver; based on the monitoring, inferring, by a hardware processor of the networked system, that the driver is planning to stop in an illegal stopping zone located a predetermined distance to the destination; and causing presentation, by the networked system, of a notification on a user interface of the user device of the driver, the notification providing an indication of the illegal stopping zone.

In example 2, the subject matter of example 1 can optionally include in response to the inferring, identifying an alternative location for stopping; and causing presentation of the alternative location of the user interface.

In example 3, the subject matter of examples 1-2 can optionally include wherein the identifying the alternative location comprises selecting, from machine learned locations that are frequent pick-up or drop off locations exceeding a threshold number or percentage, a next closest location that is a legal stopping zone.

In example 4, the subject matter of examples 1-3 can optionally include wherein the identifying the alternative location comprises extending a navigation route past the illegal stopping zone to a next legal stopping zone.

In example 5, the subject matter of examples 1-4 can optionally include wherein the identifying the alternative location comprises identifying a plurality of alternative locations; ranking the alternative locations based on one or more of distance, traffic, ease of walking for a rider, ease of driver to navigate to, and proximity to the destination indicated by the user; and selecting a best ranked alternative location.

In example 6, the subject matter of examples 1-5 can optionally include wherein the identifying the alternative location comprises identifying a parking location associated with the destination for pick-up of an item to be delivered to the user.

In example 7, the subject matter of examples 1-6 can optionally include wherein the inferring comprises accessing device data from the user device of the driver, the device data comprising location data of the user device of the driver; accessing, from a data storage, illegal stopping zone data; and triangulating the device data with the illegal stopping zone data, the triangulating comprising detecting from the location data that the driver is within a threshold distance of the illegal stopping zone.

In example 8, the subject matter of examples 1-7 can optionally include wherein the inferring comprises accessing device data from the user device of the driver, the device data comprising accelerometer data of the user device of the driver; detecting, from the accelerometer data, that the driver is slowing down; accessing, from a data storage, illegal stopping zone data; and triangulating the device data with the illegal stopping zone data, the triangulating determining that the driver is slowing down within a threshold distance of the illegal stopping zone.

In example 9, the subject matter of examples 1-8 can optionally include wherein the destination comprises a pick-up location or a drop off location; and the inferring comprises determining an address corresponding to the pick-up location or drop-off location and inferring that the driver will stop within the predetermined distance of the destination, wherein the predetermined distance is within the illegal stopping zone.

In example 10, the subject matter of examples 1-9 can optionally include wherein the user is a rider and the service is a ride sharing service, the method further comprising causing presentation of a second notification on a user device of the rider indicating the illegal stopping zone and presenting a notification of an alternative stopping location.

In example 11, the subject matter of examples 1-10 can optionally include wherein causing presentation of the notification comprises presenting the illegal stopping zone visually distinguished from a legal stopping zone.

In example 12, the subject matter of examples 1-11 can optionally include calculating a route to the alternative location, the route to the alternative location being different from a route calculated to the destination.

Example 13 is a system for providing navigation guidance to avoid illegal stopping zones. The system includes one or more processors and a storage device storing instructions that, when executed by the one or more hardware processors, causes the one or more hardware processors to perform operations comprising identifying a destination of a driver providing a transportation service to a user; monitoring a user device of the driver; based on the monitoring, inferring that the driver is planning to stop in an illegal stopping zone located a predetermined distance to the destination; and causing presentation of a notification on a user interface of the user device of the driver, the notification providing an indication of the illegal stopping zone.

In example 14, the subject matter of example 13 can optionally include wherein the operations further comprise in response to the inferring, identifying an alternative location for stopping; and causing presentation of the alternative location of the user interface.

In example 15, the subject matter of examples 13-14 can optionally include wherein the identifying the alternative location comprises selecting, from machine learned locations that are frequent pick-up or drop off locations exceeding a threshold number or percentage, a next closest location that is a legal stopping zone; extending a navigation route past the illegal stopping zone to a next legal stopping zone; or identifying a parking location associated with the destination for pick-up of an item to be delivered to the user.

In example 16, the subject matter of examples 13-15 can optionally include wherein the identifying the alternative location comprises identifying a plurality of alternative locations; ranking the alternative locations based on one or more of distance, traffic, ease of walking for a rider, ease of driver to navigate to, and proximity to the destination indicated by the user; and selecting a best ranked alternative location.

In example 17, the subject matter of examples 13-16 can optionally include wherein the inferring comprises accessing device data from the user device of the driver, the device data comprising location data of the user device of the driver; accessing, from a data storage, illegal stopping zone data; and triangulating the device data with the illegal stopping zone data, the triangulating comprising detecting from the location data that the driver is within a threshold distance of the illegal stopping zone.

In example 18, the subject matter of examples 13-17 can optionally include wherein the inferring comprises accessing device data from the user device of the driver, the device data comprising accelerometer data of the user device of the driver; detecting, from the accelerometer data, that the driver is slowing down; accessing, from a data storage, illegal stopping zone data; and triangulating the device data with the illegal stopping zone data, the triangulating determining that the driver is slowing down within a threshold distance of the illegal stopping zone.

In example 19, the subject matter of examples 13-18 can optionally include wherein the user is a rider and the service is a ride sharing service, the operations further comprising causing presentation of a second notification on a device of the rider indicating the illegal stopping zone and presenting an alternative location.

Example 20 is a machine-storage medium for providing navigation guidance to avoid illegal stopping zones. The machine-storage medium configures one or more processors to perform operations comprising identifying a destination of a driver providing a transportation service to a user; monitoring, by the networked system, a user device of the driver; based on the monitoring, inferring that the driver is planning to stop in an illegal stopping zone located a predetermined distance to the destination; and causing presentation of a notification on a user interface of the user device of the driver, the notification providing an indication of the illegal stopping zone.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    monitoring, by a networked system, a device of the driver as the driver traverses a navigation route to a destination, the monitoring being based on device data received from the device of the driver as the driver traverses the navigation route to the destination;
    inferring from the device data, by a hardware processor of the networked system, that the driver is planning to stop in an illegal stopping zone located within a predetermined distance to the destination; and
    in response to inferring from the device data received from the device of the driver that the driver is planning to stop in the illegal stopping zone:
        determining an alternative location that is a legal stopping zone;
        causing presentation of a first notification on a user interface of the device of the driver that includes an indication of the illegal stopping zone and an indication of the alternative location; and
        causing presentation of a second notification on a user interface of a device of a rider that includes instructions to meet the driver at the alternative location.

2. The method of claim 1, wherein determining the illegal stopping zones comprises machine-learning the illegal stopping zones.

3. The method of claim 1, wherein determining the alternative location comprises:
    determining whether a next legal stopping zone is available by extending a navigation route past the illegal stopping zone a threshold distance; and
    based on the next legal stopping zone being available within the threshold distance, selecting the next legal stopping zone in a direction that the driver is traveling as the alternative location or based on no next legal stopping zone being available within the threshold distance, selecting a location short of the destination as the alternative location.

4. The method of claim 1, wherein determining the alternative location comprises:
    identifying a plurality of alternative locations;
    ranking the alternative locations based on one or more of distance, traffic, ease of walking for a rider, ease of navigation for the drive, or proximity to the destination; and
    selecting a best ranked alternative location.

5. The method of claim 1, wherein determining the alternative location comprises identifying a parking location associated with the destination.

6. The method of claim 1, wherein the inferring comprises:
    accessing, from a data storage, illegal stopping zone data; and
    triangulating the device data with the illegal stopping zone data, the triangulating comprising detecting from the device data that the driver is within a threshold distance of the illegal stopping zone.

7. The method of claim 1, wherein causing presentation of the first notification and the second notification comprises presenting the illegal stopping zone visually distinguished from a legal stopping zone.

8. The method of claim 1, wherein determining the alternative location comprises:
    analyzing historical trip data to identify hotspots that are frequent stopping locations based on a threshold number or percentage of stops at the locations over a predetermined period of time.

9. The method of claim 1, wherein the indication of the illegal stopping zone is presented in a text box in proximity to an icon associated with an area that is the illegal stopping zone.

10. The method of claim 1, wherein the causing presentation of the first notification and the second notification is in response to both the inferring that the driver is planning to stop in the illegal stopping zone and the driver being within a predetermined distance of the illegal stopping zone.

11. The method of claim 1, wherein the causing presentation of the first notification includes providing a statement that the rider has been notified to meet the driver at the alternative location.

12. A system comprising:
one or more hardware processors; and
a storage device storing instructions that, when executed by the one or more hardware processors, cause the one or more hardware processors to perform operations comprising:
monitoring a device of the driver as the driver traverses a navigation route to a destination, the monitoring being based on device data received from the device of the driver as the driver traverses the navigation route to the destination;
inferring from the device data that the driver is planning to stop in an illegal stopping zone located within a predetermined distance to the destination; and
in response to inferring from the device data received from the device of the driver that the driver is planning to stop in the illegal stopping zone:
determining an alternative location that is a legal stopping zone;
causing presentation of a first notification on a user interface of the device of the driver that includes an indication of the illegal stopping zone and an indication of the alternative location; and
causing presentation of a second notification on a user interface of a device of a rider that includes instructions to meet the driver at the alternative location.

13. The system of claim 12, wherein determining the illegal stopping zones comprises machine-learning the legal stopping zone.

14. The system of claim 12, wherein determining the alternative location comprises:
determining whether a next legal stopping zone is available by extending a navigation route past the illegal stopping zone a threshold distance; and
based on the next legal stopping zone being available within the threshold distance, selecting the next legal stopping zone in a direction that the driver is traveling as the alternative location or based on no next legal stopping zone being available within the threshold distance, selecting a location short of the destination as the alternative location.

15. The system of claim 12, wherein determining the alternative location comprises:
identifying a plurality of alternative locations;
ranking the alternative locations based on one or more of distance, traffic, ease of walking for a rider, ease of navigation for the drive, or proximity to the destination; and
selecting a best ranked alternative location.

16. The system of claim 12, wherein determining the alternative location comprises identifying a parking location associated with the destination.

17. A machine storage medium storing instructions that, when executed by one or more hardware processors of a machine, cause the machine to perform operations comprising:
monitoring a device of the driver as the driver traverses a navigation route to the destination, the monitoring being based on device data received from the device of the driver as the driver traverses the navigation route to the destination;
inferring from the device data that the driver is planning to stop in an illegal stopping zone located within a predetermined distance to the destination; and
in response to inferring from the device data received from the device of the driver that the driver is planning to stop in the illegal stopping zone:
determining an alternative location that is a legal stopping zone;
causing presentation of a first notification on a user interface of the device of the driver that includes an indication of the illegal stopping zone and an indication of the alternative location; and
causing presentation of a second notification on a user interface of a device of a rider that includes instructions to meet the driver at the alternative location.

* * * * *